United States Patent
Khojastepour et al.

(10) Patent No.: US 10,296,394 B2
(45) Date of Patent: May 21, 2019

(54) CONSISTENT HASHING

(71) Applicant: NEC Laboratories America, Inc., Princeton, NJ (US)

(72) Inventors: Mohammad Khojastepour, Lawrenceville, NJ (US); Rajesh Mahindra, Sunnyvale, CA (US); Sampath Rangarajan, Bridgewater, NJ (US); Karthikeyan Sundaresan, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 344 days.

(21) Appl. No.: 15/362,439

(22) Filed: Nov. 28, 2016

(65) Prior Publication Data

US 2017/0161109 A1 Jun. 8, 2017

Related U.S. Application Data

(60) Provisional application No. 62/262,964, filed on Dec. 4, 2015.

(51) Int. Cl.
| | |
|---|---|
| *G06F 9/46* | (2006.01) |
| *G06F 9/50* | (2006.01) |
| *H04L 29/08* | (2006.01) |

(52) U.S. Cl.
CPC .......... *G06F 9/505* (2013.01); *G06F 9/5061* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,355,977 B1* | 4/2008 | Li | .......................... H04L 45/00 370/235.1 |
| 2016/0088072 A1* | 3/2016 | Likhtarov | ........... H04L 67/1008 709/226 |

OTHER PUBLICATIONS

DeCandia, et al., "Dynamo: Amazon's Highly Available Key-value Store", Amazon.com, SOSP'07, Oct. 2007, pp. 205-220.

* cited by examiner

*Primary Examiner* — Wissam Rashid
(74) *Attorney, Agent, or Firm* — Joseph Kolodka

(57) ABSTRACT

Computer-implemented methods and a system are provided for distributing tasks between a plurality of processes in a computer network. A method includes distributing, by a load balancer in the computer network, tasks between the plurality of processes. The method further includes maintaining, by the load balancer, a registry for each of the tasks. For a given task, the registry indicates which of the plurality of processes to which the given task is distributed based on a hash function. The method also includes forming, by the load balancer, a respective set of registries for each of the plurality of processes, based on a set of thresholds. The method additionally includes redefining, by the load balancer, the set of thresholds when one of the plurality of processes ceases or a new process, added to the plurality of processes, commences.

7 Claims, 6 Drawing Sheets

CONSISTENT HASHING

RELATED APPLICATION INFORMATION

This application claims priority to U.S. Provisional Patent Application Ser. No. 62/262,964, filed on Dec. 4, 2015, incorporated herein by reference in its entirety.

BACKGROUND

Technical Field

The present invention relates to hash functions and, more particularly, to consistent hash functions.

Description of the Related Art

Consider the problem of accessing a distributed number of nodes, called worker, by using a value, called task ID, through an entity, called load balancer (which may include multiple handlers), to perform a task related to the task ID.

An example of this case is where the workers are multiple cache machines with different data cached on them and a client would query a particular text and the cache machine would return a data related to the query. Here, the task is responding to the query and the task ID is the query or more precisely the query text. This is an exemplary query-response scenario.

Another example is when particular procedure needs to be performed by the workers and the result is responded by the worker. For example, consider checking different cryptographic keys on different machines to break an encryption. In this case, the tasks IDs are different cryptographic keys which based on them the task is routed to different workers in the pool by the load balancer. A third example is where the task is not performed in single query and instead a session is established between the client and the worker and subsequent queries with the same task ID would be handled by the same worker.

While the main idea of load balancing across pool of workers is primary, consistency of mapping the task with the same task ID to the same worker (if it exists and the pool of user is stationary and not changing) is usually a secondary requirement for many scenarios. We note that among the three examples mentioned above, the second example does not require the consistency, while the first and third example would require consistency as a secondary condition. The main reason is that there would be a set of data for each query or session that is kept by a particular worker.

Thus, there is a need for consistent hashing.

SUMMARY

According to an aspect of the present invention, a computer-implemented method is provided for distributing tasks between a plurality of processes in a computer network. The method includes distributing, by a load balancer in the computer network, tasks between the plurality of processes. The method further includes maintaining, by the load balancer, a registry for each of the tasks. For a given task, the registry indicates which of the plurality of processes to which the given task is distributed based on a hash function. The method also includes forming, by the load balancer, a respective set of registries for each of the plurality of processes, based on a set of thresholds. The method additionally includes redefining, by the load balancer, the set of thresholds when one of the plurality of processes ceases or a new process, added to the plurality of processes, commences.

According to another aspect of the present invention, a computer implemented method is provided for distributing tasks between a plurality of processes in a computer network. The method includes distributing, by a load balancer in the computer network, tasks between the plurality of processes. The method further includes generating, by the load balancer, a slotted hash function for which sets of inputs corresponding to two different output values, defined as slots, are equal. The sets of inputs include task identifiers for the tasks. The method also includes forming, by the load balancer, a table that indicates the correspondence between the slots and the plurality of processes, based on values derived using the slotted hash function.

According to yet another aspect of the present invention, a system is provided for distributing tasks between a plurality of processes in a computer network. The system includes a load balancer. The load balancer is configured to distribute tasks between the plurality of processes. The load balancer is further configured to maintain a registry for each of the tasks. For a given task, the registry indicates which of the plurality of processes to which the given task is distributed based on a hash function. The load balancer is also configured to form a respective set of registries for each of the plurality of processes, based on a set of thresholds. The load balancer is additionally configured to redefine the set of thresholds when one of the plurality of processes ceases or a new process, added to the plurality of processes, commences.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
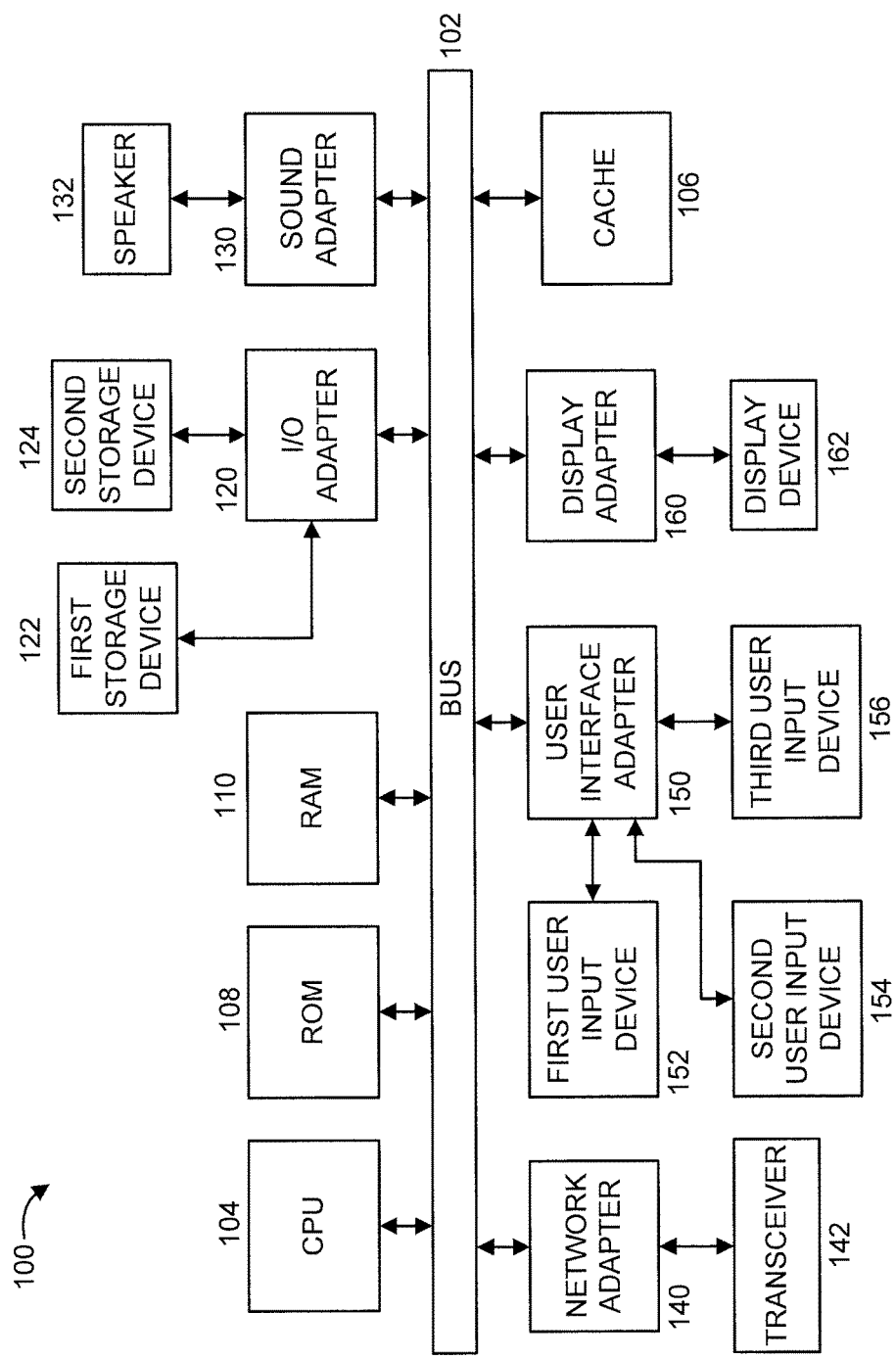
FIG. 1 shows an exemplary processing system to which the present invention may be applied, in accordance with an embodiment of the present invention.

The present invention is directed to consistent hashing.

In an embodiment, the present invention addresses the problem of consistent hashing by providing a deterministic approach for hashing. Ordinarily, consistent hashing is achieved by considering the span of the hash values (the output of the hash functions) and partitioning it where each partition will be directed to only one worker by the load balancer. This means that there is a one-to-one correspondence between the partitions and the set of workers. The hash values are usually referred to as HASH and the span of the hash values as a hash ring indicating that there is an ordering on the output of the hash function. Considering the hash ring, the partitions may be denoted by several pieces of the ring by indicating the start and end of each piece of the ring. One possible way is to consider multiple thresholds where the HASH values between every two thresholds indicate a piece of the hash ring. Multiples of such hash ring pieces may correspond to a worker.

Alternatively, in an embodiment, it is presumed that the workers IDs are appointed to each threshold (from among a set of thresholds) and each piece after or before (moving clock-wise) a threshold belong to the corresponding workers whose ID is assigned to this threshold.

Still alternatively, in another embodiment, it is presumed that each threshold belongs to a particular worker (by assigning the worker ID to it) and the HASH values are mapped based on their distance to all thresholds. In other words, the midpoint between each threshold marks the point that, before that belongs to the node before, and after that belongs to the node after. Nonetheless, there might be a hash value corresponding to the mid-point, in which case it should be assigned to the node after or before to avoid confusion.

For the sake of illustration, we consider two possible scenarios as follows.

In the first possible scenario, the number of hash values in the hash ring is large enough so that we do not want to keep a table for every hash value. In this case, we abstract the problem by assuming that the values in the hash ring belong to the interval [0,1) of real values. Almost all the results derived for this abstract model hold through (of course within the quantization approximation) if the hash size is large enough (e.g., but not limited to, 32 bits).

In the second possible scenario, the number of hash values are small (e.g., but not limited to, 10 bits). In this scenario, we consider the case that a table of size 2^10=1024 may be kept to address each hash value to a particular worker.

The second possible scenario removes the difficulty of the problem completely to the extent that all defined figures of merit for the consistent hashing problem are satisfied optimally.

Although consistent hashing has been conventionally implemented using stochastic functions, the present invention utilize a deterministic approach. A deterministic approach does not suffer in terms of any of the figures of merit, and also is simultaneously superior in all aspects of consistent hashing in terms of 4 different figures of merit (namely balance, load, spread, and migration). This includes showing that among the random functions, the uniform random function performs the best and then showing that there is a deterministic approach that beats the uniform random approach in all aspects. The presented deterministic approach can be used to find the optimal solution to the problem. However, it is noted that in practice the first order optimization is almost as good as the optimal problem since the improvement achieved through the second order optimization and above are asymptotically negligible. Also, more desirable properties of the deterministic approach are presented, e.g., the fact that the thresholds can be derived in a deterministic way and keeping all the thresholds (as it is required by the conventional stochastic approach) may not be necessary.

Finally, we notice that the process of picking a hash function and partitioning the range of its output values may be considered as defining a new hash function where for the same set of inputs it generates different outputs, one for each of the buckets or workers. Using this interpretation, a family of hash functions is generated based on a single hash function and possible partitioning of the hash ring. In a deterministic approach, this process generates a deterministic set of hash functions where each hash function corresponds to a particular number of workers.

Definitions of terms and variables used herein will now be provided.

The definition of a ranged hash function can have the following figures of merit for consistent hashing as set forth below. The set of items or task IDs are denoted by I and the set of buckets or workers are denoted by B. A view is defined as a subset of workers B and it is usually denoted by V. A ranged hash function is defined as $f: 2^B \times I \rightarrow B$ that assigns a worker to any task ID under a given view.

Load: The load of a worker is the number of task IDs that are associated to that worker under a certain view.

Spread: Given a set of views $V_1, V_2, \ldots, V_K$, the spread for a particular task ID is defined as the number of workers that this task ID can be assigned to them under different views. The term "spread", without indicating the worker, denotes the maximum number of spread for all workers.

Monotonicity: A ranged hash function is called monotone, if by adding a new worker to a given view, a task ID that belonged to a given worker either belongs to the same worker or the new worker under the new view, but is not assigned to any of the other old (existing) workers.

Balance: A ranged hash function is called balanced if the load is (almost) equal for all the workers. We define the variance $\sigma$ of the load for all workers to be a figure of the merit to quantify the balance. The lower the variance, the better the balance. Since the variance decays proportional to the square of number of workers, we use the quantity $\sigma^2/\lambda^2$, where $\lambda$ is the mean of the load. We note that this quality measure for the balance is more precise than saying the system is balanced if the load for a worker is O(I/K), where K is the number of workers.

Migration: If the view changes from $V_1$ to $V_2$, then the sum of absolute amount of modifications in terms of the number of task IDs for each worker is called the migration. We note that for a monotone ranged hash function, the migration is simply equivalent to the load of the new worker. However, if the hash function is not monotone, then the calculation of the migration is more involved. For example, while the load for a worker might have not changed, the corresponding task IDs for that user might have changed, which has to be accounted for in calculating the migration.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
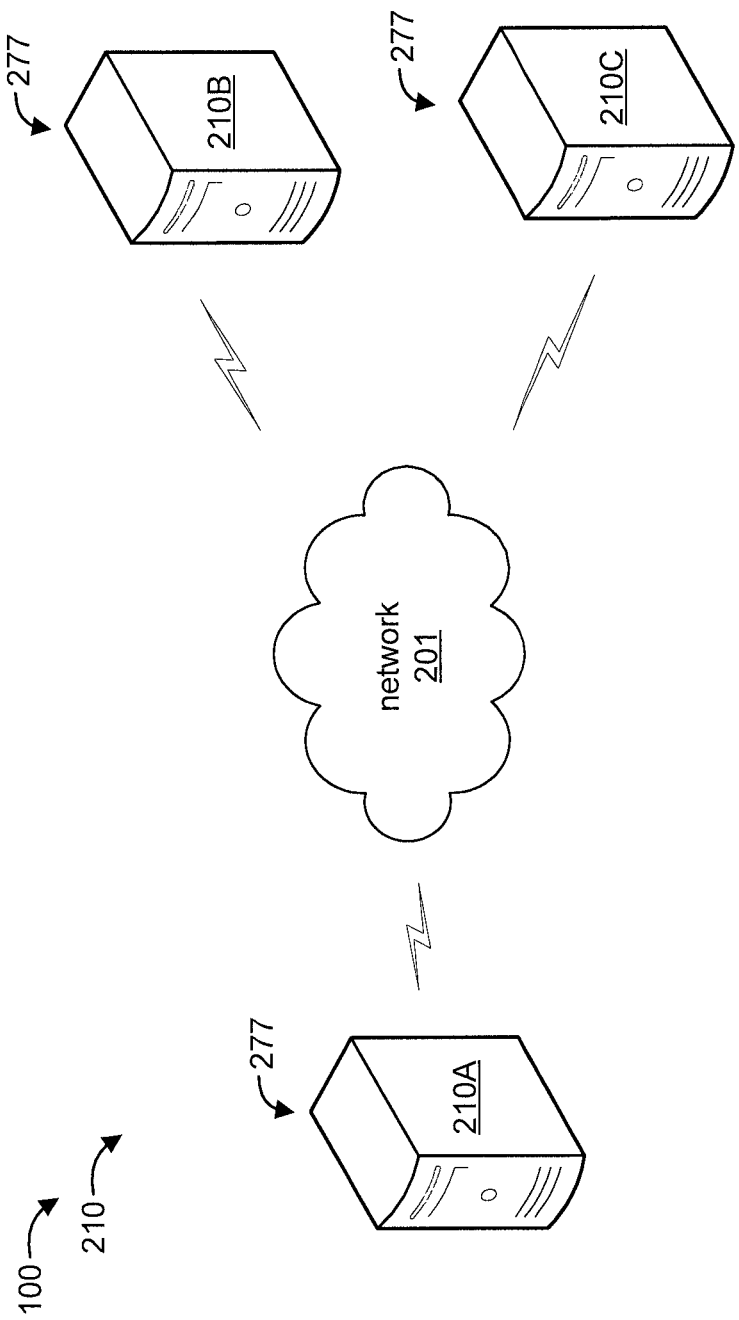
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
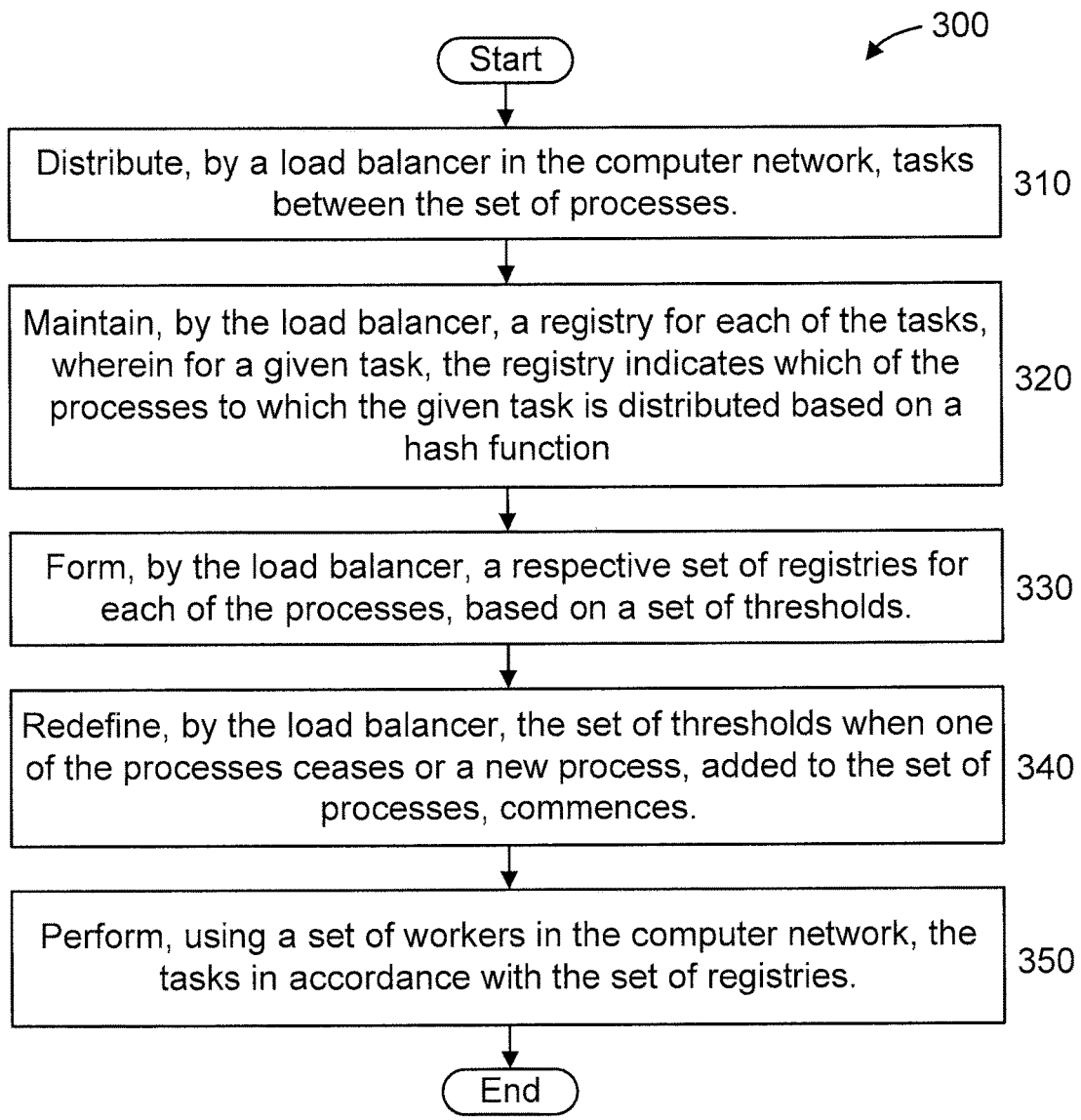
FIG. 3 shows another exemplary method for distributing tasks between a set of processes in a computer network, in accordance with an embodiment of the present invention.
Figure 4:
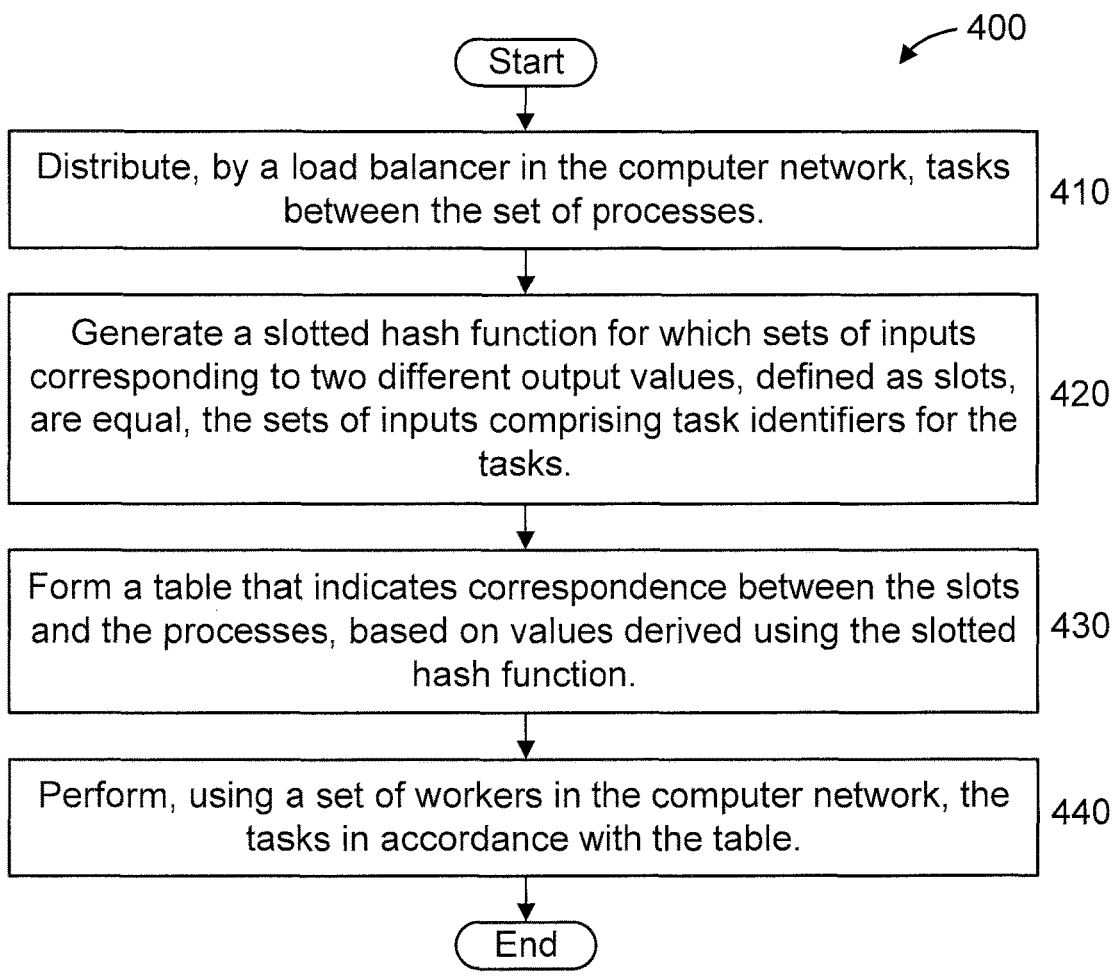
FIG. 4 shows another exemplary method for distributing tasks between a set of processes in a computer network, in accordance with an embodiment of the present invention.
Figure 6:
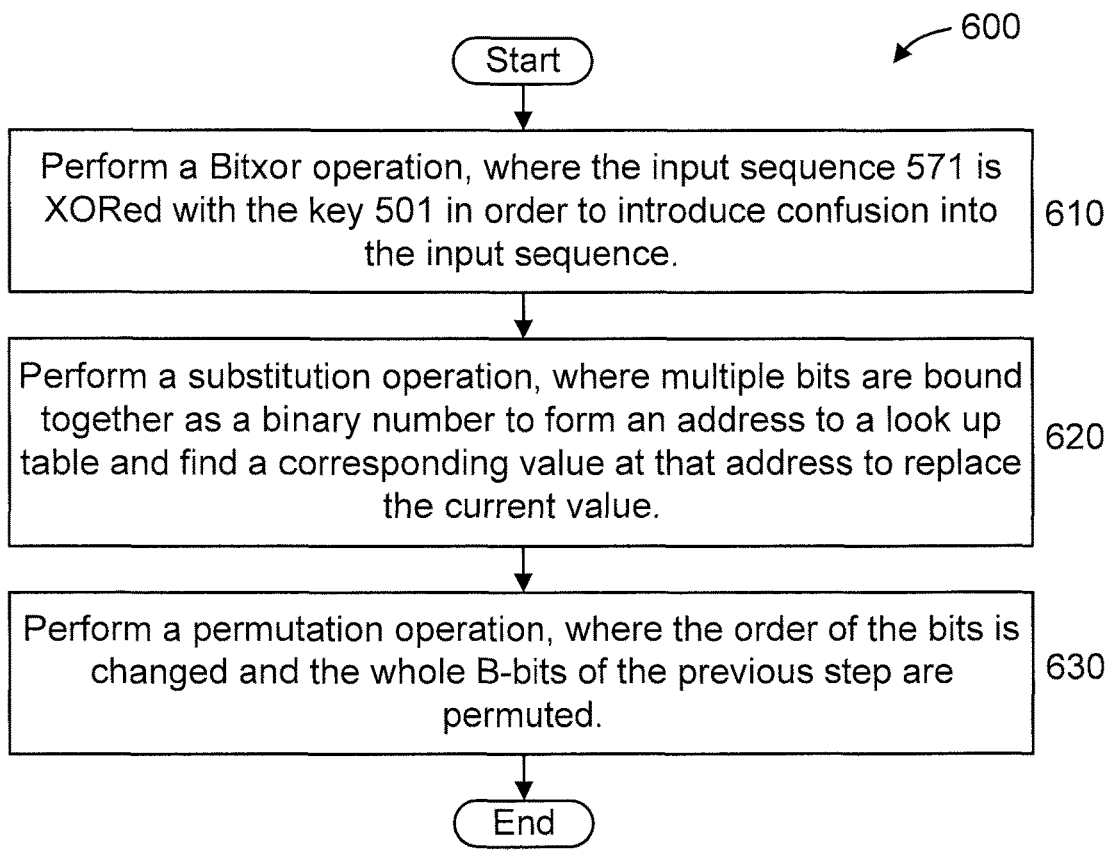
FIG. 6 shows an exemplary method for processing input bits by the hash function structure of FIG. 5, in accordance with an embodiment of the present invention.

Further, it is to be appreciated that processing system 100 may perform at least part of the methods described herein including, for example, at least part of method 300 of FIG. 3 and/or at least part of method 400 of FIG. 4 and/or at least part of method 600 of FIG. 6. Similarly, part or all of system 200 may be used to perform at least part of method 300 of FIG. 3 and/or at least part of the method 400 of FIG. 4 and/or at least part of the method 600 of FIG. 6.

FIG. 2 shows an exemplary environment 200 to which the present invention can be applied, in accordance with an embodiment of the present invention. The environment 200 is representative of a computer network to which the present invention can be applied. The elements shown relative to FIG. 2 are set forth for the sake of illustration. However, it is to be appreciated that the present invention can be applied to other network configurations as readily contemplated by one of ordinary skill in the art given the teachings of the present invention provided herein, while maintaining the spirit of the present invention.

The environment 200 at least includes a set of computer processing systems 210. The computer processing systems 210 can be any type of computer processing system including, but not limited to, servers, desktops, laptops, tablets, smart phones, media playback devices, and so forth. For the sake of illustration, the computer processing systems 210 include server 210A, server 210B, and server 210C.

In an embodiment, the present invention uses various approaches to distribute tasks amongst a plurality of computer processes 277 running on the computer processing systems 210. The distribution and execution of the tasks is implemented using hash functions as described herein. The hash functions are used to implement load balancing between the computer processes performing the tasks. Moreover, the hash functions are used to maintain a requirement that maps tasks with a same task identifier (ID) to a same worker.

In the embodiment shown in FIG. 2, the elements thereof are interconnected by a network(s) 201. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIG. 3 shows an exemplary method 300 for distributing tasks between a set of processes in a computer network, in accordance with an embodiment of the present invention.

At step 310, distribute, by a load balancer in the computer network, tasks between the set of processes.

At step 320, maintain, by the load balancer, a registry for each of the tasks, wherein for a given task, the registry indicates which of the processes to which the given task is distributed based on a hash function.

At step 330, form, by the load balancer, a respective set of registries for each of the processes, based on a set of thresholds.

At step 340, redefine, by the load balancer, the set of thresholds when one of the processes ceases or a new process, added to the set of processes, commences.

At step 350, perform, using a set of workers in the computer network, the tasks in accordance with the set of registries.

FIG. 4 shows another exemplary method 400 for distributing tasks between a set of processes in a computer network, in accordance with an embodiment of the present invention.

At step 410, distribute, by a load balancer in the computer network, tasks between the set of processes.

At step 420, generate a slotted hash function for which sets of inputs corresponding to two different output values, defined as slots, are equal, the sets of inputs comprising task identifiers for the tasks.

At step 430, form a table that indicates correspondence between the slots and the processes, based on values derived using the slotted hash function.

At step 440, perform, using a set of workers in the computer network, the tasks in accordance with the table.

A description will now be given regarding perfect hashing, in accordance with an embodiment of the present invention.

Let us first consider a few variations of the problem. First, we consider the scenario referred to as perfect hashing. In this scenario, the range or span of the hash function is divided into several partitions. Consider a hash ring where based on the number of workers, the hash ring is divided into equal size partitions and each partition belongs to one worker. Let us allow multiple pieces of the ring (using multiple thresholds for example) define each partition. We would like to be able to scale out (increase the number of workers) or scale in (decrease the number of workers) and still maintain the balance (equal size partition).

Case 1 under the concept of perfect hashing will now be described, in accordance with an embodiment of the present invention.

Case I: Thresholds assigned to a worker cannot be reassigned to another worker, but a new threshold may be introduced, or an old threshold may be removed. When scaling out, only new thresholds may be added, and during scale in only thresholds may be removed. We would like to scale out and scale in the workers arbitrarily with any order, e.g., scale out by adding A, then B, then C, and then scale in by removing B.

It turns out that a solution for this case requires a lot of thresholds that grows higher than an exponential rate based on the number of workers. For example, only 13 workers would need more than 2^32 thresholds. The solution is as follows.

Let us consider a fixed set of workers $(A_1, \ldots, A_n)$. Consider a set Perm_all that includes all possible permutations of n−1 workers. There are n ways to pick n−1 workers and each selection has a (n−1)! permutation, hence the total number of such permutations is n!. It is always possible to construct a string of size n! such that when the string is placed on a ring, all permutations in the set Perm_all appear only once in this wrapped string. This wrapped string is called a universal cycle. We note that the number of times that any item appears in a universal cycle is equal to exactly (n−1)! Also, in general, any permutation of size k less than n appears exactly (n−k)! times. This property means that if we place n! thresholds equally spaced in a ring and denote each threshold with a corresponding position in the universal cycle, all the workers would have equal size partitions. Also, by removing any of the workers and all its corresponding thresholds (but not moving any other threshold from its position), the size of the partitions for all the remaining workers would still be equal. This property leads to the following solution.

Given the (maximum) size of the set of workers, say n, we find a universal cycle of size n! which incorporates all possible n−1 permutations at its different positions only once. Then we consider n! threshold levels that are equally spaced in the hash ring. Putting the universal cycle on the hash ring, every n! positions in the universal cycle will be mapped to a threshold in the hash ring. Now, construct n sets, each including (n−1)!thresholds that belong to the same element in the universal cycle. These sets are called the basis. To do scale out, we can select any set from the basis and actually place the corresponding threshold on the hash ring and assign the new worker to them. To perform scale in by removing any particular worker, we will remove all the thresholds that belong to the same worker from the hash ring.

Case 2 under the concept of perfect hashing will now be described, in accordance with an embodiment of the present invention.

Case II: Thresholds assigned to a worker cannot be reassigned to another worker, but a new threshold may be introduced, or an old threshold may be removed. When scaling out, only new thresholds may be added, and during scale in only thresholds may be removed. We would like to scale out and scale in the workers arbitrarily but the order of scaling in is not arbitrary. This means that when scaling in, the algorithm may choose only one or provide only a few options for the workers that can be removed.

While the solution for the first case needed an exhaustive number of thresholds, adding an extra constraint that the scale in process may not be totally arbitrary tremendously reduces the requirement for the number of thresholds. It can be shown that only 1+n(n−1)/2 thresholds would suffice to perform a scale out and scale in solution up to n workers.

The process of scale out is as follows. The first worker needs only one threshold (or actually none). The second worker can simply divide the hash circle into two equal parts by adding one threshold. The third worker now can take ⅓ of each of the arcs assigned to the first two workers and everybody now has a total arc size of ⅔. This process may be continued by adding a k−1 threshold for the $k^{th}$ worker and taking 1/k of each arc that belongs to each worker which leaves every worker with a total arc size of 1/k. It is not hard to see that it is always possible to add only a single threshold and take away 1/k of the total arc for each of the previous k−1 workers. The reason is that any worker added previously has at most k−1 pieces, therefore at least one of the pieces has to be larger than 1/k of the total arc that belong to this worker. The scale in process is performed by removing the last set of threshold for the last worker that has been added.

We note that the solution for the second case has another advantage with respect to the solution for the first case. In the second case, it is not required to know the maximum number of the workers a priori when the algorithm is designed and it can be dynamically changed on the fly as long as the system is capable of assigning and managing 1+n(n−1)/2 thresholds. However, for the first case, the universal cycles cannot be designed to be cascaded, i.e., one incorporates another one of smaller size by picking equal distance elements from the bigger cycle. Therefore, it is not possible to design a system that can scale gracefully by increasing the number of workers.

Case 3 under the concept of perfect hashing will now be described, in accordance with an embodiment of the present invention.

Case III: In both cases where scaling out or scaling in, new thresholds may be added and old thresholds may be removed. This may possibly allow reassignment of an old threshold to a new worker by removing a threshold and adding a new threshold in its place for another worker. We would like to scale out and scale in the workers arbitrarily but the order of scaling in is not arbitrary. This means that when scaling in, the algorithm may choose only one or provide only a few options for the workers that can be removed.

The extra flexibility of removing and adding while scaling out allows further reducing the required number of thresholds. The total number of threshold positions that the system may add when they are not actually placed on the hash circle or remove them when they are already placed on the hash circle is given by the summation of values from $\lfloor n/2 \rfloor$ to n, where $\lfloor x \rfloor$ denotes the floor of x that is the largest integer not greater than x. If n=2k is even this is equal to 3k(k−1)/2+1 and if n=2k+1 is odd this is equal to 3k(k−1)/2+2. Of course, it is always possible to share one of the thresholds irrespective of the value of the k. Moreover, if k counts, then j thresholds for j can also be used to equally divide the circle into k partitions as well. Therefore it is enough to sum up the values between $\lfloor n/2 \rfloor$ to n since none of them can count the other one and any number smaller than those would count at least one of the numbers in this range.

For all the three cases discussed above, that there is specific number of thresholds that can provide a solution for each case. It can be shown that for either of the cases discussed above, the number of thresholds cannot be any lower if one is to maintain the conditions of that specific case.

The first two cases generate a hashing strategy that is monotone because none of the old thresholds are removed and by adding a new threshold only part of the are that belongs to an existing worker will be assigned to a new worker. However, there would be no movement of a hash value between the existing workers.

A further description will now be given of the deterministic approach of the present invention for imperfect consistent hashing.

Previously, it was described that to achieve perfect hashing, one requires to have many thresholds (at least in the order of $O(n^2)$). In particular, if the number of threshold per worker is n, then we can have perfect hashing at least up to n workers. In a more practical setting, if the number of thresholds remains small, e.g., $O(n)$, it is not possible to have perfect hashing. A deterministic approach is better than a stochastic approach in designing the thresholds.

In an embodiment, the present invention uses a deterministic approach in designing the thresholds. Let us consider the case where only one threshold is assigned to a worker. First, we ask the following question: If the thresholds for some workers are already determined using some policy (stochastic, deterministic or combination of both) and a new worker is going to be added, what would be the optimal solution? In other words, we are looking for the locally optimal solution for adding a threshold for a new worker given that the thresholds for the all workers are known. Obviously the answer to this question depends on what figure of merit is of interest. Since we are adding only one new threshold and not moving or reassigning (renaming) the existing threshold. The monotonicity would be preserved irrespective of where we place the threshold. Minimization of the migration also means that we should try to move as little of the task IDs as possible and the answer could be one or even zero. This generates a huge imbalance. Therefore, as a first and foremost figure of merit, consider the minimization of the maximum load or equivalently the minimization of imbalance. Considering $\sigma^2/\lambda^2$, this value is minimized if we consider the largest distance between the thresholds and introduce a new threshold to divide this into half. In other words, we find the largest $l_k$ and divide it into half to generate the new $l_k$ and $l_{k+1}$. It turns out that a simple policy which always tries to find the threshold based on the locally optimal solution has a variance that is bounded above by the following:

$$\sigma = \text{Var}(l) = \frac{1}{8K^2}$$

Hence the maximum value of $\sigma^2/\lambda^2$ is less than ⅛ that is an order of magnitude better than the stochastic approach.

The migration factor for the mentioned deterministic approach is exactly half of the size of the largest length $l_1, \ldots, l_K$. Therefore the migration in the step K would be exactly as follows:

$$\frac{1}{2^{\lceil \log_2 K \rceil}}$$

where $\lceil x \rceil$ denotes the ceiling of x that is the smallest integer not greater than x. The above value is in fact always less than 1/K and it would be equal to 1/K only if K is an integer power of 2. Therefore, in terms of the migration, this simple deterministic strategy is superior.

The deterministic approach has a benefit in terms of the spread as well. Since the thresholding scheme is deterministic, it is known how they appear and in fact any given task ID or item cannot belong to more than $\lceil \log_2 K \rceil$ workers. This means that the spread is at most $\lceil \log_2 K \rceil$.

Moreover the deterministic approach has a benefit that there is no need to memorize the position of the threshold and only the number of workers K is needed to know them all.

A description of problem formulation will now be given, in accordance with an embodiment of the present invention.

The problem is to find a deterministic thresholding scheme which minimizes the maximum imbalance factor $\sigma^2/\lambda^2$ over all possible number of thresholds K where adding a new worker (scaling-out) or removing an existing worker (scaling in) can happen in any order. Let us first consider the case where only one threshold is allowed per worker and only one threshold is added or removed at a time.

It turns out that the answer to the above problem is exhaustively hard to search since for any finite horizon K, there are infinitely many possibilities for adding or removing workers. Also, the decision on a particular threshold at each step not only affects the current value of the imbalance factor, but the combination of positions of all prior thresholds affects the possibility of selecting a proper threshold as a new one. In the following, a suboptimal solution is provided that is quite effective in a practical setting and the properties of the proposed solution imply that the optimal solution would be very close to this suboptimal solution. First we note the following:

(a) Given a set of thresholds, the locally optimal solution for introducing a new threshold is to divide the maximum distance between two consecutive thresholds out of the set of existing thresholds into half.

(b) Given a set of threshold, the locally optimal solution for removing an existing threshold is to find the one for which the multiplication of the size of the two partitions before and after this threshold are the minimum.

Now consider a simplified problem as follows. Let us adjust the strategy to perform the locally optimal solution for all the thresholds except the first two thresholds (in fact the first threshold can be always placed at 0). It turns out that the solution to this problem can be easily found since the value of the imbalance function $\sigma^2/\lambda^2$ shows a cyclic behavior where the peak of the first cycle is usually the highest. The numerical values of the thresholds are approximately at 0 and 0.4334 or equivalently at 0 and 0.5666. Generalizing the same idea, the same question can be asked if except the first k thresholds all other thresholds are found based on locally optimal solution and we are to find the optimal value of the first k thresholds. Investigating the optimal solution through numerical evaluation reveals that beyond K=2 and K=3 for which the value of imbalance function is around 0.894 and 0.626, respectively, the improvement is very asymptotic and it bounds below around 0.4. Hence, in practice the solution for K=2 and K=3 are most commonly used. The solution for K=2 is having the thresholds at 0 and then at (0, 0.4334). The solution for K=3 is having the thresholds at 0, then at (0, 0.42) and finally at (0, 0.42, 0.7265).

It is always possible to increase the number of thresholds per worker. This will facilitate achieving balance and better migration due to possibility of having multiple segments per partition. Another benefit of having multiple thresholds is the possibility of diversifying the migration between several workers. This in turn generates a ground for having a backup of each worker to be distributed between several workers where it is important to maintain a backup-worker for each task ID. By increasing the number of thresholds per worker, the imbalance factor would be reduced as a result of achieving more uniform distribution in the size of the partitions that belong to different workers. The imbalance factor could potentially reduce by an extra factor of $O(1/T^2)$, where T is the number of thresholds per worker. This extra factor depends on the thresholding policy. For both uniformly random thresholding, and the proposed deterministic thresholding the same extra benefit $O(1/T^2)$ is achieved. Nonetheless, a weaker thresholding policy might not benefit from the full potential of multiple thresholding per worker if it is not carefully designed.

A description will now be given of an optimization problem that is easy solved numerically, in accordance with an embodiment of the present invention.

The optimal solution and a suboptimal solution are presented. The suboptimal solution exhibits a very simple formulation and yet performs very close to the optimal solution.

Let $l_{i,n}$ denote the length of the partition for the $i^{th}$ worker when there are n workers scheduled on the hash circle. We presume that the circumference of the hash circle is unity. The imbalance factor can be written in terms of $l_{i,n}$'s as follows:

$$Imb(n) = \sigma^2 / \lambda^2 = E[l_{i,n}^2] - E^2[l_{i,n}] = n \sum_{i=1}^{n} l_{i,n}^2 - 1$$

The optimization problem can be formulated as follows:

$$\min_{k=1,\ldots,n} \max Imb(k)$$

$$\text{s.t.} \sum_{i=1}^{n} l_{i,n} = 1$$

By numerically solving the optimization problem, it would become evident that the solution is very well behaved. First, the solution turns out to be selecting the largest partition and dividing it into two partitions. Let us call the ratio of the smaller to the larger new partitions as $\eta(k)$ when the total number of new partitions is k. These ratios for all values of n determine the optimal thresholding strategy. Second, as the number of workers n increases, the solution of $\eta(k)$ for smaller value of k becomes stable. The optimal value of $\eta(k)$ for k=2 to 30. For example $\eta(2)$ =0.7095, $\eta(3)$=0.8171, $\eta(4)$=0.8662, and so forth.

We note that the optimal value of $\eta(k)$ is very close to the following function:

$$\gamma(k) = 1 - \frac{1}{2k - 0.53}$$

In fact, for the values of k greater than 4, the difference between $\eta(k)$ and $\gamma(k)$ is less than 0.0001.

For the optimal thresholding, the first threshold is at 0.4094, and the second threshold is at 0.5416, and so forth. These thresholds are slightly different from the one obtained by considering only a few first thresholds to be variable but fixing the strategy to be dividing the largest threshold into half. It is interesting to see that in fact the global optimal strategy exhibits the fact that always the largest partition is divided into two partitions. However, the ratio of the division is not 1/2 for any number of workers. Nonetheless, this ratio tends to be 1/2 since both the functions $\eta(k)$ and $\gamma(k)$ tend to approach one which means that the ratio of the two new partitions tends to approach 1, i.e., the largest partition is divided into 1/2. Also, it reveals that the locally optimal solution would tend to approach the globally optimal strategy for the large n.

A description will now be given regarding slotted consistent hashing, in accordance with an embodiment of the present invention.

A case was described herein where the numbers of HASH values are such that it allows maintaining a full table for the assignment of every HASH value to a worker. This requires a table of the size of the number of HASH values where each entry requires a number of bits equal to the logarithm of the number of workers in base 2.

This situation may very well be generated if we pre-partition all the outputs of the hash function into equal size slots where the index of these slots denotes the output of a composite hash function. We call this situation slotted hashing.

In the case of slotted hashing, achieving a consistent hashing demonstrates a very different behavior. First of all, up to the quantization limit, it is always possible to achieve perfect hashing irrespective of the number of workers since we can directly map or remap each slot to any worker. Secondly, under the condition of perfect hashing, the required migration has a lower bound which is exactly achieved my moving or remapping a corresponding number of slots from a set of old workers to a new worker. Monotonicity is also easy to achieve. Therefore, in the case of slotted hashing, the original problem of consistent hashing becomes less dominant. However, there are several new properties that a slotted consistent hashing can satisfy. The most dominant property is that there could be two very different (primary) hash functions that after becoming slotted hash function a one-2-one correspondence between the output slots of the slotted hash function may be defined. This allows the possibility of having two different sets of task IDs be mapped to the same slots and hence the corresponding task IDs would always be handled by the same worker. For example, consider three sets of task IDs called IMSI, TEID and GUTI where each client has one of each kind. While there might be an inherent or inherited connections between two task IDs, for example between TEID and GUTI, there might be no simple connection (beside from having a look up table for all possibilities) between IMSI and the other two. A possible scenario is where IMSI for each client is a preassigned random-looking value, while GUTI and TEID might be assigned by each worker in a distributed manner when the first contact between the client and the worker is made. Furthermore, the total number of possible GUTI, TEID and IMSI might be quite different, or equivalently, the bit length associated to each one might be different.

The notion of a slotted hash function allows for generating a connection between these IDs which is in the granularity of one slot. This means that each slot has an (almost) equal number of task IDs in each category but the number of task IDs in different categories that belong to the same slot might be potentially different.

Using a slotted hash function, it is always possible to use hashing to direct the tasks identified by IMSI to a worker and the worker will assign a task ID of type GUTI or TEID for which the corresponding hash value belongs to the same slot. Even though this process is performed in distributed manner by the worker that is currently handling this slot, the assignment of a new GUTI and TEID using a slotted hash function ensures that future references with the task IDs of each of the three types, i.e., IMSI, GUTI, and TEID, would be assigned to the same slot irrespective of which worker is currently handling this slot.

Another benefit of slotted hashing is the ease of implementation especially the migration. The migration of a set of task IDs from one worker to another worker has to be performed such that there are no pending jobs or incomplete jobs for the tasks that belong to this set. Hence, it is desirable to perform the migration process in smaller chunks, for example, in the granularity of slots or fraction of slots. Hence, the system can use a set of commands such as Put (or write), Activate, Release, Backup in order to (1) write the states of all task IDs within a slot to a new workers registry, (2) activate an existing slot in a registry and know that it has been assigned as the primary worker for the task IDs in this slot, (3) release or purge an existing slot in the registry and (4) know that it has been assigned a backup worker for this slot, respectively.

A description will now be given regarding the design of slotted hash functions, in accordance with an embodiment of the present invention.

A slotted hash function is a function that maps a set S to a set Q where the output items in Q are called slots and the number of different input values that map to a slot is (almost) equal for all possible slots. In the case that the number of items in the input set S is not dividable by the number of slots, then an equal number of items per slot is not possible. Hence, the term "almost equal" means that the number of items in any two different slots differ by at most one.

It is usually of practical interest for a slotted hash function to have some of the properties of randomization. For example, given any number of input and corresponding output pairs of the function, the output of the next input that is different from all known ones cannot be derived. A slotted hash function with a key is a slotted hash function for almost every key in the key range and furthermore given the function is known and some input and their corresponding output pairs are also known, the complexity of finding the key is of almost the same order of exhaustive search over the entire key space.

For example, a randomization function may have a binary input number of size B-bits as an input and generates a C-bits binary output where C<B. Other properties of slotted hash functions are as follows:

The function is easy to compute;
The reverse function is also easy to compute if the key is known;
The key should be hard to guess for an adversary which could mean that the function is highly nonlinear; and
All the inputs that correspond to an output slot should look uniformly random, that is, they should have uniform distribution over the input range.

Another desired property is that for a given sequence of input stream that is drawn from a uniformly random input, the output slot should be uniformly random. The same property should hold with probability 1 when the input streams are generated from a deterministic function (rather than an instance of a pseudo-inverse of the hash function). This includes the case that the input streams are made of fixing a number of bits and selecting only a portion of the input bit stream to take all possible values, like a counter.

The complexity of finding the key should be of the order of $2^K$ evaluation of the slotted hash function even if the function and its algorithm are completely known and an adversary has access to multiple pairs of input and outputs. Here, the key is a binary number of size K bits and is usually equal to the length of the input, i.e., B.

A possible design of a slotted hash function is to first use a randomization function or a good cryptographic encryption function to randomize the input string and then select a portion of the output bits that is equal to the required size of the hash value. However, a randomization function is usually more complex than is required since it has to provide a one-to-one function. A direct design of a slotted hash function usually provides a more efficient and faster algorithm. A possible design is described hereinafter.

A description will now be given regarding a design based on substitution-permutation, in accordance with an embodiment of the present invention.

Figure 5:
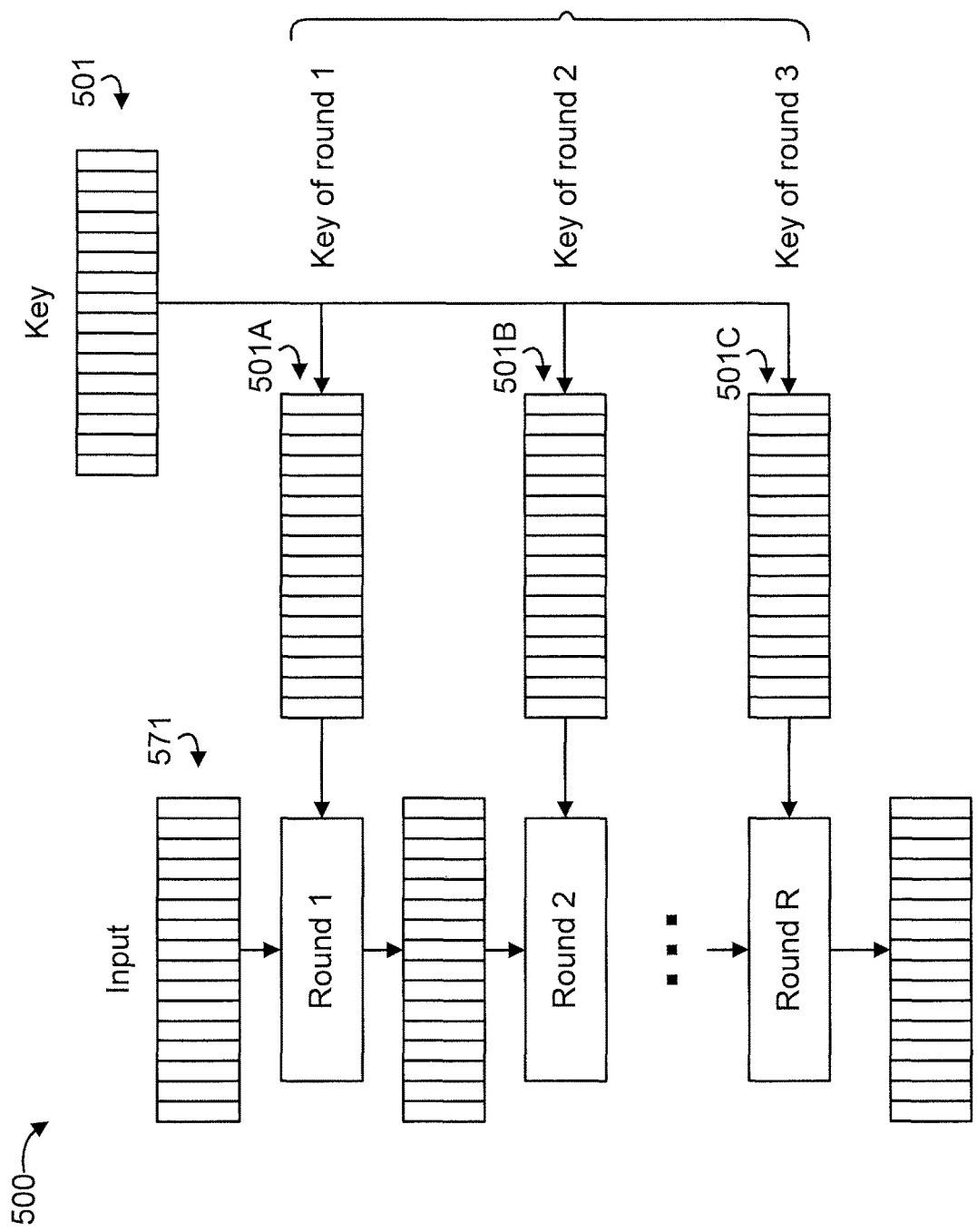
FIG. 5 shows an exemplary structure of a hash function by using R rounds, in accordance with an embodiment of the present invention.

One approach to design a slotted hash function is to use multiple rounds of the same algorithm with different inputs that are sequentially fed into each round. The input at any round, say r, is derived from the original input and key as well as the output of the previous rounds. FIG. 5 shows an exemplary structure 500 of a hash function by using R rounds, in accordance with an embodiment of the present invention. FIG. 6 shows an exemplary method 600 for processing input bits by the hash function structure 500 of FIG. 5, in accordance with an embodiment of the present invention.

At each round R, the input bits 571 are processed in the following three steps:

At step 610, perform a Bitxor operation, where the input sequence 571 is XORed with the key 501 in order to introduce confusion into the input sequence.

At step 620, perform a substitution operation, where multiple bits are bound together as a binary number to form an address to a look up table and find a corresponding value at that address to replace the current value. This step binds the confusion introduced in the previous step between multiple bits.

At step 630, perform a permutation operation, where the order of the bits is changed and the whole B-bits of the previous step are permuted. This step diffuses the confusion generated in the previous step by dispersing the bits into several different blocks.

The action of step 630 is important since in the next round the confusion from a single block diffuses into several blocks. For example, if only one bit in the input sequence changes, the corresponding outputs after round 1 cannot be different in more than the size of the substitution box that is the logarithm of the number of entries in the substitution table in base 2.

A slotted hash function that uses a key 501 may or may not use a key expansion algorithm 609 where the key (e.g., key 501A for round 1, key 501B for round 2, and key 501R for round R) for each round is derived from the original key 501 but they are different in general. Round 1 may use key 501 as provided or may use key 501A that has been expanded relative to input key 501. That is, key 501 may be the same as key 501A for round 1.

The output of each round is called the state of the round. The substitution may use an equal size or a smaller size output bit string than the input bit string. By using a smaller output bit string, the size of the state string reduces or remains the same such that after the last round the output bit stream is of length C derived from the input bit stream that was of length B. We note that to preserve the property of having a uniform number of inputs in each slot, one has to use the same substitution box for all partitions of the strings in a given round. This means that the size of the input string has to be dividable by the size of the input string of the substitution box for this round. Therefore, starting from $B_1=B$, one can only select a Q1 that counts B as the size of the input bit string for the substitution box which generates W1 bits. Hence the size of the state after round 1 becomes $B_2=B_1W_1/Q_1$. Similarly, after round k, the size of the input becomes $B_{k+1}=B_kW_k/Q_k$. This means that not every reduction is possible. For example, if the size of the input bits is 16 and we want to change it to 15, the size of the substitution box has to be $2^{16}$, meaning that the input size has to be 16. However, there might be different ways to change an input size of 64 bits to 10 bits. One possible way is $B_1=64$, $B_2=48$, $B_3=36$, $B_4=30$, $B_5=25$, $B_6=15$, $B_7=10$. The length of the reduction can also be more/less than 6 rounds if it is required.

A description will now be given of a round function, in accordance with an embodiment of the present invention.

In an embodiment, a sample operation can be used as a round operation. A round hash function that uses a key may or may not use a key expansion algorithm where the key for each round is derived from the original key but they are different in general. A simple implementation may use the same key in each round and still exhibits very good randomness with small number of rounds (about 3 as for 24 or 32 bit input size). Also the permutation and substitution boxes may depend on the round, however, a simple implementation of slotted hash function uses a the round function without changing substitution or permutation at each step and has quite good performance in terms of randomness of the output.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for distributing tasks between a plurality of processes in a computer network, the method comprising:
   distributing, by a load balancer in the computer network, tasks between the plurality of processes;
   generating, by the load balancer, a slotted hash function for which sets of inputs corresponding to two different output values, defined as slots, are equal, the sets of inputs comprising task identifiers for the tasks; and
   forming, by the load balancer, a table that indicates the correspondence between the slots and the plurality of processes, based on values derived using the slotted hash function;
   wherein the slotted hash function is generated by applying plurality of rounds of a substitution-permutation operation on a task registry in order to generate a slot number for each of the slots.

2. The computer-implemented method of claim 1, wherein the substitution-permutation operation comprises using different ones of the sets of inputs and different keys at each of multiple rounds of the substitution-permutation operation, wherein the subsequent ones of the set of inputs and subsequent ones of the keys are all respectively derived from an initial one of the sets of inputs and an initial one of the keys corresponding to a first one of the multiple rounds.

3. The computer-implemented method of claim 1, wherein the substitution-permutation operation comprises applying an exclusive-OR operation, followed by a substitution operation, and followed by a permutation operation, to the sets of inputs.

4. The computer-implemented method of claim 3, wherein, in a substitution operation, a number of inputs is different than a number of outputs.

5. The computer-implemented method of claim 1, wherein a total number of input values in the sets of inputs and a total number of the slots are not equal, and wherein a number of items in any two different ones of the slots differ by at most one item.

6. A computer-implemented method for distributing tasks between a plurality of processes in a computer network, the method comprising:
- distributing, by a load balancer in the computer network, tasks between the plurality of processes;
- generating, by the load balancer, a slotted hash function for which sets of inputs corresponding to two different output values, defined as slots, are equal, the sets of inputs comprising task identifiers for the tasks; and
- forming, by the load balancer, a table that indicates the correspondence between the slots and the plurality of processes, based on values derived using the slotted hash function; and
- writing states of all of the task identifiers within each respective one of the slots into a respective worker registry.

7. A computer-implemented method for distributing tasks between a plurality of processes in a computer network, the method comprising:
- distributing, by a load balancer in the computer network, tasks between the plurality of processes;
- generating, by the load balancer, a slotted hash function for which sets of inputs corresponding to two different output values, defined as slots, are equal, the sets of inputs comprising task identifiers for the tasks; and
- forming, by the load balancer, a table that indicates the correspondence between the slots and the plurality of processes, based on values derived using the slotted hash function;
- randomizing the sets of inputs using a function selected from the group consisting of a randomization function and a cryptographic function; and
- selecting a portion of the output of the randomization function or cryptographic function as an input to the slotted hash function.

\* \* \* \* \*